United States Patent [19]
Lauritsen

[11] Patent Number: 5,947,064
[45] Date of Patent: Sep. 7, 1999

[54] MULTI-ENGINE PLANT WITH A COMMON FRESHWATER COOLING SYSTEM

[75] Inventor: Hans Christian Lauritsen, Nysted, Denmark

[73] Assignee: Man B&W Diesel A/S, Copanhagen SV, Denmark

[21] Appl. No.: 09/011,981

[22] PCT Filed: Oct. 7, 1996

[86] PCT No.: PCT/DK96/00423

§ 371 Date: Feb. 20, 1998

§ 102(e) Date: Feb. 20, 1998

[87] PCT Pub. No.: WO97/13968

PCT Pub. Date: Apr. 17, 1997

[30] Foreign Application Priority Data

Oct. 10, 1995 [DK] Denmark ................... 1137/95

[51] Int. Cl.[6] .................................................. F01P 3/00
[52] U.S. Cl. ................. 123/41.29; 123/563; 123/DIG. 8
[58] Field of Search ............... 123/41.29, 41.31, 123/DIG. 8, 563

[56] References Cited

U.S. PATENT DOCUMENTS

| 4,317,439 | 3/1982 | Emmerling . | |
|---|---|---|---|
| 5,201,285 | 4/1993 | McTaggart | 123/41.29 |
| 5,394,854 | 3/1995 | Edmaier et al. . | |
| 5,669,338 | 9/1997 | Pribble et al. | 123/41.31 |

FOREIGN PATENT DOCUMENTS

| 0508068 | 10/1992 | European Pat. Off. . |
|---|---|---|
| 0602348 | 6/1994 | European Pat. Off. . |
| 2549009 | 5/1977 | Germany . |
| 3214855 | 11/1982 | Germany . |
| 3226883 | 8/1983 | Germany . |
| 61-28712 | 2/1986 | Japan . |
| 0437283 | 2/1982 | Sweden . |
| 2055963 | 3/1981 | United Kingdom . |
| 8000863 | 5/1980 | WIPO . |
| 9314306 | 7/1993 | WIPO . |

*Primary Examiner*—Noah Kamen
*Attorney, Agent, or Firm*—Sughrue, Mion, Zinn, Macpeak & Seas, PLLC

[57] ABSTRACT

A multi-engine plant with a common freshwater cooling system comprises turbocharged diesel engines (1) which in their coolant system are provided with a charging air cooler 911), a high-temperature circuit (HT) and a low-temperature circuit (LT). The high-temperature circuit (4) contains a fist three-way circuit delivery pipe (7) to the engine with coolant. The low-temperature circuit (5) contains a second three-way valve (13) supplying coolant to the delivery pipe (14) of the charging air cooler in the LT circuit. The charging air cooler (11) is a two-step cooler in which the first step (10) is part of the HT circuit and the second step (19) is part o the LT circuit. A control valve (16) can adjust the coolant flow through the second step in dependency of the engine load. The discharge pipe (15) from the control valve is connected to the second three-way valve and a common return pipe (3). The discharge piper of the HT circuit from the engine is in flow communication with the common return pipe (3) and is connected to the first three-way valve, which is also connected to a common supply pipe (2).

17 Claims, 6 Drawing Sheets

PRIOR ART

MULTI-ENGINE PLANT WITH A COMMON FRESHWATER COOLING SYSTEM

BACKGROUND OF THE INVENTION

1. Field of the Invention

The present invention relates to a multi-engine plant with a common freshwater cooling system, comprising several turbocharged diesel engines having a common supply pipe for coolant and a common return pipe. Some of the engines have in their coolant system a charging air cooler, a high-temperature circuit (HT) and a low-temperature circuit (LT).

2. Description of Related Art

DE-A1 32 14 855 describes the nearest prior art multi-engine plant with a common freshwater cooling system, where the individual engine in its coolant system is provided with a charging air cooler, a high-temperature circuit (HT) and a low-temperature circuit (LT). The high-temperature circuit contains a first three-way valve which is controlled by a first thermosensor and supplies a first circulation pump in the HT circuit delivery pipe to the engine with recycled coolant from the HT circuit discharge pipe from the engine and with colder coolant as needed. The low-temperature circuit contains a second three-way valve controlling by means of a second thermosensor the mixing ratio between warmer and colder coolant to the delivery pipe of the charging air cooler in the LT circuit. A supply pipe for coolant common to the engines is connected to the LT circuit, and a common return pipe is connected to the second three-way valve in this circuit.

This cooling system is designed to advantageously control the heat exchange in the charging air cooler in such a manner that the charging air in the lower operational mode of the engine is heated by the coolant and is cooled by it in the upper operational mode of the engine. The heating of the charging air at low engine load, and particularly at operation in cold surroundings where the inlet air to the compressor may be very cold, is of substantial importance to achieve good combustion conditions when the engine is run on heavy fuel oil. The heating of the charging air results in a higher compression temperature which promotes the self-ignition of the fuel. This German publication also states that the first thermosensor controls the first three-way valve so that the supply temperature of the coolant to the engine is kept constant, and that the second thermosensor controls the second three-way valve so that the discharge temperature of the coolant from the LT circuit to the common return pipe is kept constant.

The cooling system of the individual engines in the known multi-engine plant integrates the LT circuit into the HT circuit. The delivery for cold coolant to the first three-way valve is connected with the discharge pipe of the LT circuit from the charging air cooler, and the delivery for warmer coolant to the second three-way valve being connected to the discharge pipe of the HT circuit from the engine. This results in the disadvantage that the operation of the HT circuit is influenced by the operation of the LT circuit. Nor is it expedient that the inlet temperature to the cylinder cooling of the engine is kept constant, as this results in a cooling temperature for the hottest engine components which increases with the engine load.

A substantial disadvantage of the known multi-engine plant is also that the heat exchange in the charging air cooler is controlled by the second thermosensor on the basis of the water temperature in the discharge pipe of the HT circuit from the engine. This control is slow-acting in case of sudden changes in the engine load, because the load change first has to be reflected in warmer or cooler cylinder elements before the need for a changed control of coolant flows can be detected by the second thermosensor. The multi-engine plant is typically used in a ship where a number of auxiliary engines connected to power generators are in a stand-by position until the power consumption rises. This typically occurs in manoeuvring in a harbour or in other coastal areas where the starting-up of major power consumers, such as bow propellers or anchor winches, leads to a sudden jump in the power consumption. as a result a stand-by engine is started, or an engine already running is suddenly loaded at full load. The slow control of the charging air cooler involves the very well-known and undesired problem that the engine smokes heavily after the load increase until the adjustment to the new operating condition has been completed. For environmental reasons, this smoking is very undesired in coastal waters.

DE-C2 25 49 009 describes a single engine, the freshwater cooling system of which only contains an HT circuit comprising a three-way valve, which provides a circulation pump with recycled water of which a portion of the flow passes through a coolant cooler so that the delivery temperature to the engine is kept constant. The delivery pipe to the engine passes through a first intercooler. The engine also has a saltwater circuit in which sea water is pumped to a three-way valve which is controlled by the charging air condition of the engine and passes a large or small amount of cold sea water through a second intercooler, whereupon the sea water flows through the coolant cooler in the HT circuit and is passed overboard. The publication mentions the possibility of having the control of the heat exchange in the intercooler take place on the basis of the charging air pressure. It is a disadvantage in that the HT circuit contains a coolant cooler, and the cooling system is work-consuming and expensive to maintain because of the salt-water-based low-temperature circuit.

U.S. Pat. No. 5,394,854 describes a single engine with an HT circuit for cooling the engine and a first intercooler and with an LT circuit for cooling lubricant and a second intercooler. In the HT circuit, the first intercooler is inserted in parallel with the engine or coupled in series downstream of it. The second intercooler in the LT circuit is provided with a valve-controlled bypass pipe controlled by, for example, the charging air pressure. On the discharge side, each circuit has a coolant cooler provided with a valve-controlled bypass pipe, which complicates the cooling system.

SUMMARY OF INVENTION

The object of the present invention is to provide a multi-engine plant of the type mentioned, which renders possible a rapid adjustment of the charging air cooling for any operational condition with a simple and reliable structure having a reduced number of components. This reduces environmentally harmful smoke formations at sudden load changes for one or more of the engines of the plant.

In view of this object, the multi-engine plant according to the invention is designed with a common freshwater cooling system, comprising several turbocharged diesel engines having a common supply pipe for coolant and a common return pipe, of which engines at least some in their coolant system are provided with a charging air cooler, a high-temperature circuit and a low-temperature circuit; the high-temperature circuit containing a first three-way valve which is connected to the common supply pipe and is controlled by a first thermosensor and supplies a first circulation pump in a HT circuit delivery pipe to the engine with recycled coolant from a HT circuit discharge pipe from the engine and with colder coolant as needed, which discharge pipe of the HT circuit from the engine is in flow communication with the common return pipe and is connected to the first three-way valve; the low-temperature circuit containing a second three-way valve which is connected to the common supply pipe and is controlled by a second thermosensor and supplies a second circulation pump in a LT circuit delivery pipe to the charging air cooler with recycled coolant from a LT circuit discharge pipe and with colder coolant at need, which discharge pipe of the LT circuit is in flow communication with the common return pipe and is connected to the second three-way valve; and the charging air cooler being a two-step cooler in which the first step is part of the delivery pipe of the HT circuit to the engine, and the second step is part of the LT circuit and is connected to a control valve which is connected to the LT circuit discharge pipe and can close or open more or less for the coolant flow through the second step of the charging air cooler in dependency of the engine load.

The adaptation of the cooling effect of the charging air cooler to sudden load changes in order to provide an engine which is suited for running on heavy fuel oil with a minimum environmental impact is achieved in a manner which is known per se from DE-C2 25 49 009. The coolant influences the charging air in two steps. The first step is in the delivery pipe of the HT circuit to the engine. In the second step in the LT circuit, the coolant in the LT circuit can be made to bypass the second step of the cooler by means of the control valve controlled in dependency of the engine load, for example on the basis of the charging air pressure. At low loads the coolant in the first step can heat the charging air to a temperature which is advantageously high for the combustion of heavy fuel oil, and at heavy loads both steps can function to cool the charging air.

The second circulation pump in the LT circuit ensures that this circuit in the engine functions independently of the operation of the other engines and independently of the HT circuit of the same engine. Thus, the coolant flow in the LT circuit is unaffected by more remote pressure changes in the common supply pipe produced by the other engines' consumption of cold coolant from the supply pipe and unaffected by local pressure changes in the common supply pipe produced by the consumption of cold coolant for the HT circuit of the same engine.

The first three-way valve of the HT circuit is connected to the common supply pipe, and the discharge pipe from the engine in this circuit is flow-connected with the common return pipe and is connected to the first three-way valve. Consequently, the three-way valve can recycle the discharge water from the engine according to need or admix cold water from the supply pipe for control of the delivery water temperature, while excess discharge water is discharged into the common return pipe. The first circulation pump ensures that the HT circuit is provided with water independently of both the coolant consumption of the other engines and the LT circuit consumption on the same engine.

The two circuits on the same engine may have a substantially identical structure on the delivery side, that is, two connections to the supply pipe and the return pipe, respectively, a three-way valve controlled by a thermosensor and capable of recycling discharge water in the circuit or admixing cold water from the supply pipe with simultaneous discharge of discharge water to the return pipe, and a circulation pump. This advantageously simple structure is easy to understand and very easy to maintain, and at the same time the two circuits function fully independently of each other. The coolant system of the individual engine is also very simple, because coolant coolers on the engine are not required. The simple structure renders the coolant system on the engine very reliable and simple to control, particularly because influences in one circuit do not affect the other circuit.

Preferably the first thermosensor measures the water temperature in the discharge pipe of the HT circuit from the engine, and the first three-way valve is controlled so that the water temperature in this discharge pipe is substantially constant regardless of the engine load. Keeping the water temperature constant at discharge from the cylinder section of the engine achieves a more uniform temperature on the cylinder elements subject to the heaviest thermal loads and a more efficient cooling at heavy engine loads. At the same time the uniform water temperature in all discharge pipes of the engines renders it possible to couple these pipes together without problems, as is further described in detail below.

The second thermosensor in the LT circuit can suitably measure the water temperature in the delivery pipe connected with the circulation pump, and the second three-way valve may be controlled so that the water temperature in this delivery pipe is substantially constant regardless of the engine load. This provides the advantage that the LT circuit is independent of the coolant temperature in the common supply pipe. At the same time this achieves the substantial advantage that the delivery temperature may be adjusted according to the cooling need in the second step of the charging air cooler when the engine runs at a heavy load. When the engine load is reduced, the constant delivery temperature will result in a cooling of the charging air to a lower discharge temperature. But since the charging air pressure in the turbocharged engine also drops with the engine load, this may happen in the upper load area of the engine without any risk of condensation in the charging air, because the condensation temperature of the air drops with reducing air pressure. When the engine load has dropped to an operating level where it is no longer desired to cool the charging air, the second step in the charging air cooler can be shut off by means of the control valve.

In a preferred embodiment of this invention, the common coolant system has been used to design the multi-engine plant so that at least one of the engines can run a power generator, that at least another of the engines is used for propulsion of a ship, that all the discharge pipes of the HT circuits are interconnected via a venting pipe through which hot coolant from the engine used for the propulsion can be passed through the generator-connected engine in its stand-by condition. The engine used for propulsion can be, for example, a large two-stroke cross-head engine connected with a propeller through a shaft system, and if so, the generator-connected engine or engines may be small four-stroke engines.

Alternatively, the multi-engine plant may be composed of several small four-stroke engines, all driving a power generator and a number of the engines being used for power production for an electromotor-driven propeller used for propulsion of the ship, with other engines being at stand-by for the other power consumers of the ship. When sailing between two ports, the power requirement for propulsion of the ship is largely constant, and the engine or engines used for the propulsion are normally run at a heavy engine load to achieve a low specific fuel consumption. When the ship arrives at a port, as mentioned above, some sudden jumps in the power consumption will occur owing to manoeuvring, which involves starting-up of stand-by engines. The preferred embodiment permits rapid starting-up of stand-by engines in a simple manner with minimum development of smoke in the exhaust gas, because before starting-up these engines are already heated to a suitably high temperature by the hot coolant flowing from the discharge pipe in the HT circuit of the propulsion engine through the venting pipe and into the HT circuit of the stand-by engines in the branch passing through the cylinder section.

In a particularly simple preferred embodiment, the first and the second circulation pump each circulates a substantially constant volume flow of coolant in the associated circuit regardless of the engine load. This renders it possible to use as the circulation pump a simple centrifugal pump run at a fixed speed of, for example, 1,200 rpm by means of a generator motor having a fixed frequency.

In certain types of ships, such as container ships, tankers, bulk carriers and similar ships with a large two-stroke main engine, a coolant cooler of the ship main engine preferably cools the water in the common return pipe, and the purely power-producing auxiliary engines in the engine plant are designed without coolant coolers in their HT and LT circuits. This provides the advantage that the coolant system only uses a single central cooler already available in the system. In other types of ships, such as special ships, passenger ships and similar ships with multi-engine plants exclusively containing small four-stroke engines, a single central cooler may be used in common for several engines designed without coolant coolers in their HT and LT circuits.

Preferably, the second thermosensor and the control of the control valve in the LT circuit are set so that at the discharge from the charging air cooler, the charging air has temperatures above the condensation threshold for the humidity content in the air when the engine is run at tropical conditions with a very high temperature and a high humidity in the inlet air. At this setting for avoidance of water condensation at the worst operating conditions, condensation is also avoided at all other operating conditions without the use of complex control technology. This provides a very simple and reliable coolant system.

With a view to promoting the ease of operation and maintenance of the engine and render possible the installation of the engine in a relatively constricted space, the two circulation pumps, the two three-way valves, the control valve, the lubricant cooler, the charging air cooler and the associated pipe connections are preferably all located at one end of the engine to provide access to all components in one place. Access takes place from the end of the engine, several engines may be arranged relatively close to each other.

BRIEF DESCRIPTION OF THE DRAWING

The preferred embodiments of the engine will now be described in further detail below with reference to the very schematic drawing, in which.

DESCRIPTION OF THE PREFERRED EMBODIMENTS

Figure 1:
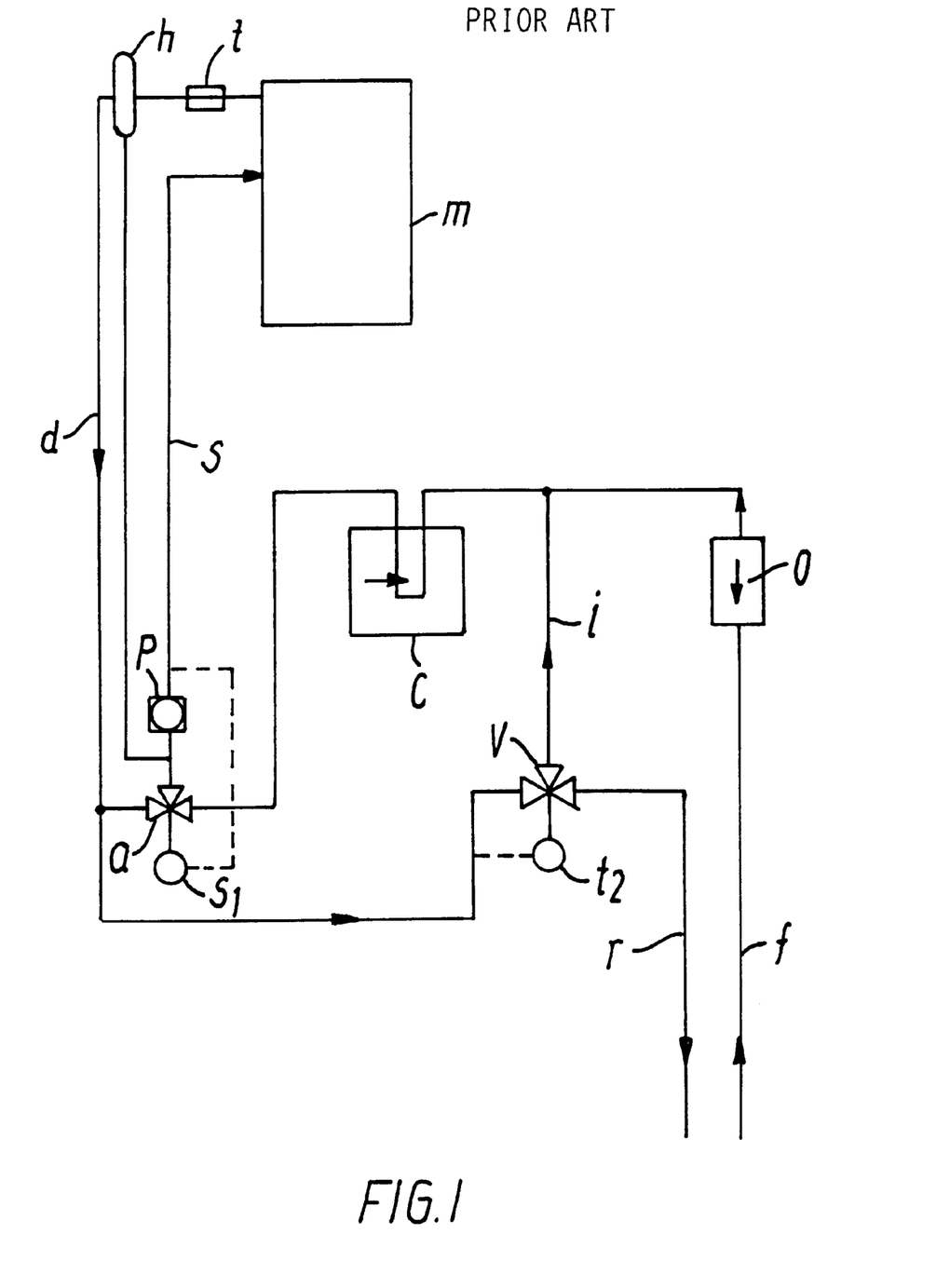
FIG. 1 shows an outline of the coolant system for an engine in a known multi-engine plant.

Referring now to FIG. 1 the prior art engine from DE-A1 32 14 855 is illustrated. An engine m has a cooling system which is connected via a feed pipe f and a return pipe r to the cooling system common to the engines. The feed water runs into an LT circuit with an oil cooler o and a charging air cooler c. An HT circuit comprises a three-way valve a, which via a circulation pump p leads coolant through a delivery pipe s to the engine, from where the water through a discharge pipe d with a throttle valve t and a pressure control tank h is returned to the three-way valve a and coupled in parallel with this to a second three-way valve v. This valve v is located in the LT circuit and discharges the hot water to either the return pipe r or via an intermediate pipe i to the charging air cooler c. From the charging air cooler the partially heated water flows to the first three-way valve a as relatively colder supply water to the delivery pipe s. The first three-way valve a is controlled by a first thermosensor t1 so that the temperature in the pipe s is kept constant. The second three-way valve v is controlled by a thermosensor t2 which keeps the temperature in the hot-water supply to the second three-way valve v and thus also the return water in the pipe r constant. As a matter of pure control engineering it is a considerable disadvantage that the total cooling system on the engine has two control circuits in the same loop (the combined LT and HT circuits) as such a control system may start oscillating at sudden load changes.

Figure 2:
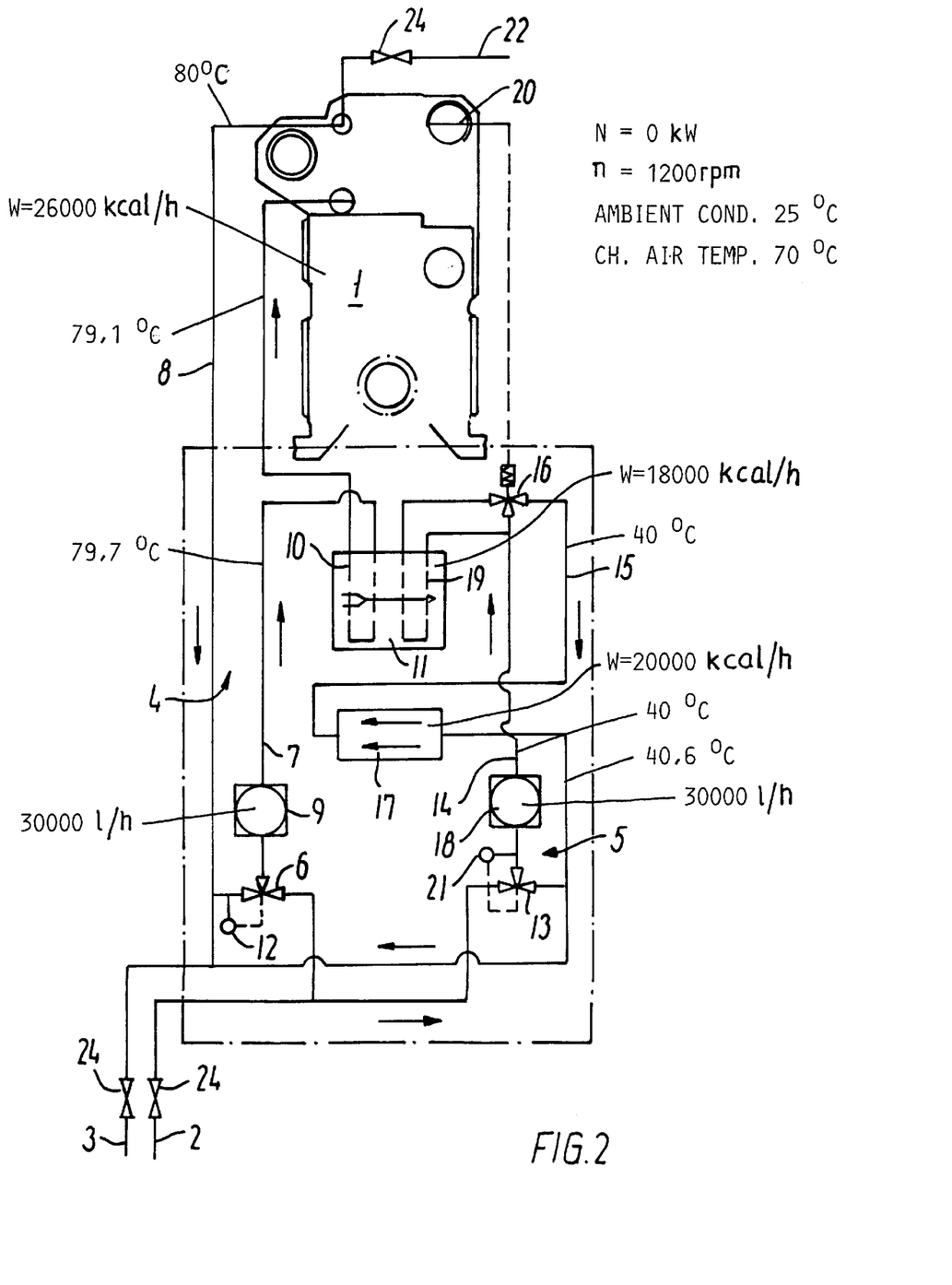
FIGS. 2 and 3 show corresponding outlines of an engine in an embodiment of the multi-engine plant according to the invention, FIG. 2 showing examples of temperature levels at idling, and FIG. 3 at full load operation.

FIG. 2 shows a schematic sectional view associated with a single engine 1, of a preferred embodiment of a cooling system according to the invention, connected with the other engines in the system through a common supply pipe 2 and a common return pipe 3. The local cooling system on the engine comprises a high-temperature circuit (HT) generally designated 4 and a low-temperature circuit (LT) generally designated 5.

The HT circuit 4 comprises a thermostat-controlled first three-way valve 6 with three connections, of which the first one is connected to the common supply pipe, the second one is connected to the delivery pipe 7 of the HT circuit, and the third one is connected to a discharge pipe 8 extending to the coolant discharge from the engine cylinder section. The delivery pipe 7 contains a circulation pump 9 and a first cooling step 10 in a charging air cooler 11 and at its end opposite to the three-way valve it is connected to the coolant supply to the cylinder section of the engine.

The thermostat control of the valve 6 includes a first thermosensor 12 which measures the temperature in the discharge pipe 8 and maintains this temperature substantially constant within a pre-determined interval by adjustment of the supply of cold coolant from the supply pipe 2.

The LT circuit 5 comprises a thermostat-controlled second three-way valve 13 with three connections, the first connected to the common supply pipe 2, the second connected to the delivery pipe 14 of the LT circuit, and the third connected to a discharge pipe 15 extending to a control valve 16 and containing an oil cooler 17. The delivery pipe 14 contains a circulation pump 18, and at its end opposite to the three-way valve 13 it is connected to the control valve 16, the third connection of which is connected to the return flow in a second cooling step 19 in the charging air cooler 11.

This second cooling step branches off from the delivery pipe 14 before the valve 16. The three-way control valve 16 may therefore let the coolant bypass the second cooling step 19 fully or partially or pass all coolant in the LT circuit through the second step. The control valve is controlled dependent on the engine load in a quick-acting manner, for example on the basis of a pressure sensor 20 in the charging air receiver or the charging air delivery to the engine or directly on the basis of the current setting of the degree of filling of the fuel pumps.

The thermostat control of the valve 13 includes a second thermosensor 21, which measures the temperature in the delivery pipe 14. The second thermosensor 21 keeps this temperature substantially constant within a predetermined interval by adjusting the supply of cold coolant from the supply pipe 2.

The components framed by a dash-and-dot line in the local circuit are all mounted at the end of the engine. In addition, the discharge pipe 8 is connected near its upper point to a venting pipe 22, connected with a venting tank 23. At the connection to the supply pipe 2, the return pipe 3 and the venting pipe 22, the cooling system of the engine has shut-off valves 24 which can be closed at the mounting and dismounting of the engine or when it is serviced.

Figure 4:
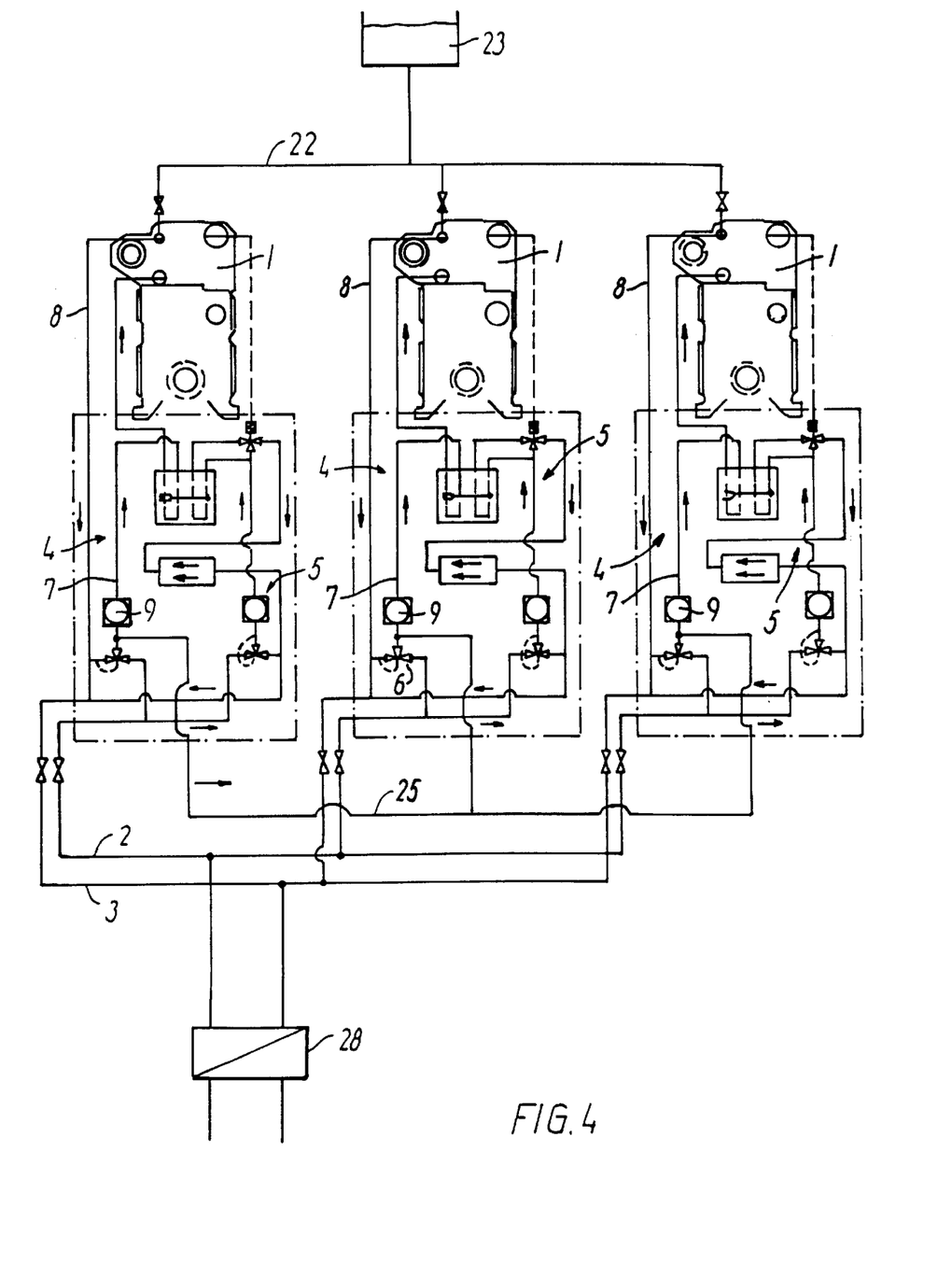
FIGS. 4 and 5 are diagrams of two different embodiments of a multi-engine plant according to the invention with three engines.

FIG. 4 illustrates the venting pipe 22 connected with the HT circuit on each of the three engines of the same type. In addition FIG. 4 shows the course of the common pipes 2 and 3, to which the engines are coupled in parallel. Also a connecting pipe 25 is connected to the delivery pipe 9 in the HT circuit of each of the three engines between the three-way valve 6 and the circulation pump 9.

Together with the venting pipe, the connecting pipe 25 ensures that engine 1 in a stand-by condition is kept warm and ready to start by the hot coolant from the pipe 8 in the engine or engines running at a load. To do so, the circulation pump 9 in the loaded engine continuously withdraws a relatively small coolant flow from the connecting pipe 25, which in turn withdraws a corresponding coolant amount from the HT circuit in the stand-by engine, which is simultaneously supplied with hot water from the venting pipe 22. The modest flow of hot water through the HT circuit of the stand-by engine keeps the engine warm.

Figure 5:
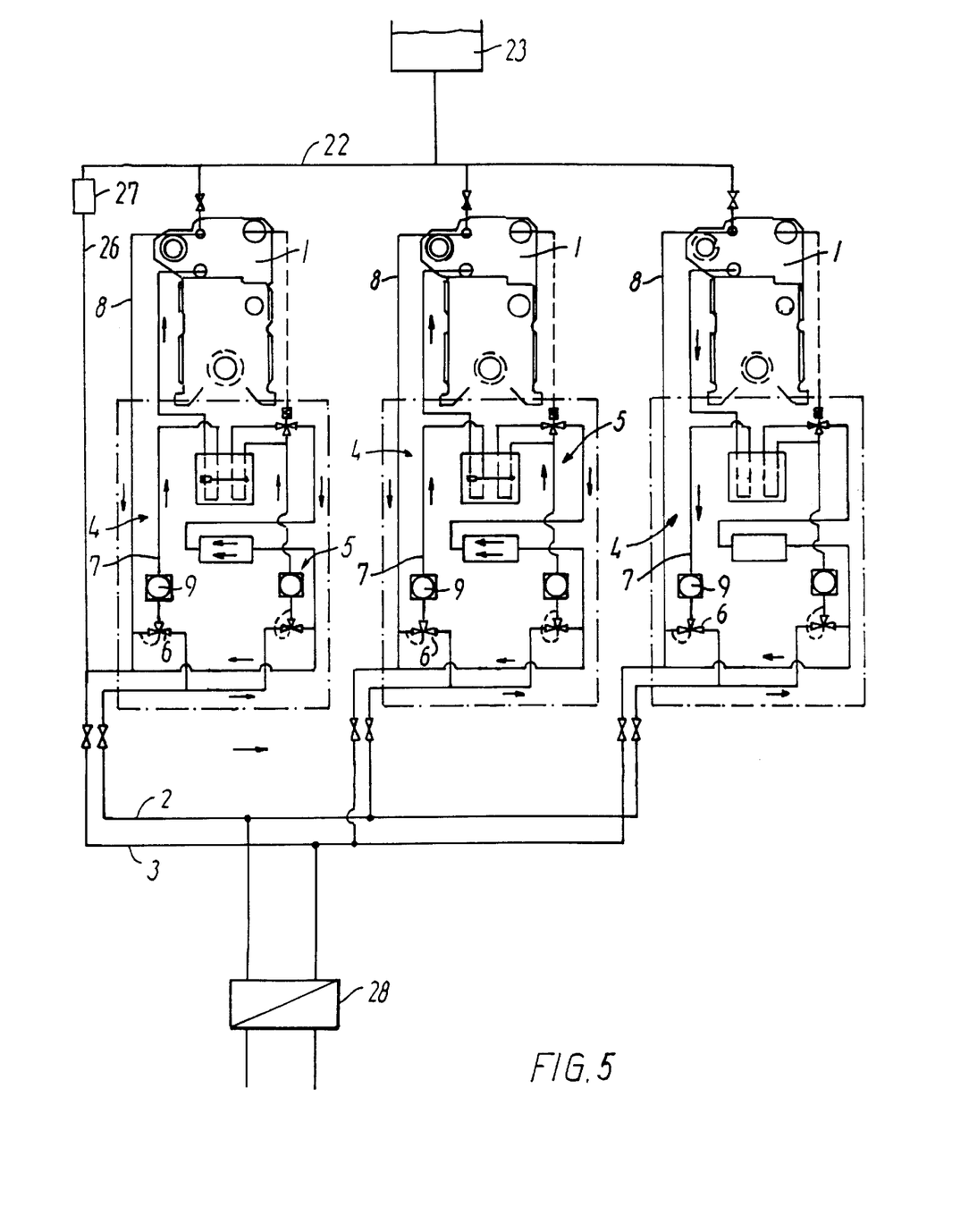

In the alternative preferred embodiment illustrated in FIG. 5, the direct connection between the discharge pipe 8 and the return pipe 3 at the three-way valve 6 has been removed. The discharge pipe 8 is flow-connected with the return pipe 3 via the venting pipe 22 and an overflow pipe 26 which is provided with a throttle means 27. The throttle means 27 provides a small flow resistance with the effect that the hot coolant from the pipe 8 delivered to the venting pipe will preferably, in step with the intake of cold water through the three-way valve 6 in the engines running at a load, flow down through the HT circuit in a stand-by engine. This is indicated in the engine shown to the right in FIG. 5. If the return water is not to be delivered to the supply pipe 2 at the stand-by engine, the above direct connection between the pipes 8 and 3 can be maintained and provided with a shutoff valve, which is kept closed on one or more of the engines in operation. If a particularly intensive heating of stand-by engines is desired, the first three-way valve 6 of these engines can be placed in a position which shuts off the discharge pipe 8.

Both FIGS. 4 and 5 illustrate a central cooler 28, which may be the coolant cooler of a large main engine or be another type of central cooler, for example if the ship does not have a large main engine. The main engine may be of the usual design apart from that its coolant cooler is dimensioned with due regard to the total cooling need of the auxiliary engines.

Figure 3:
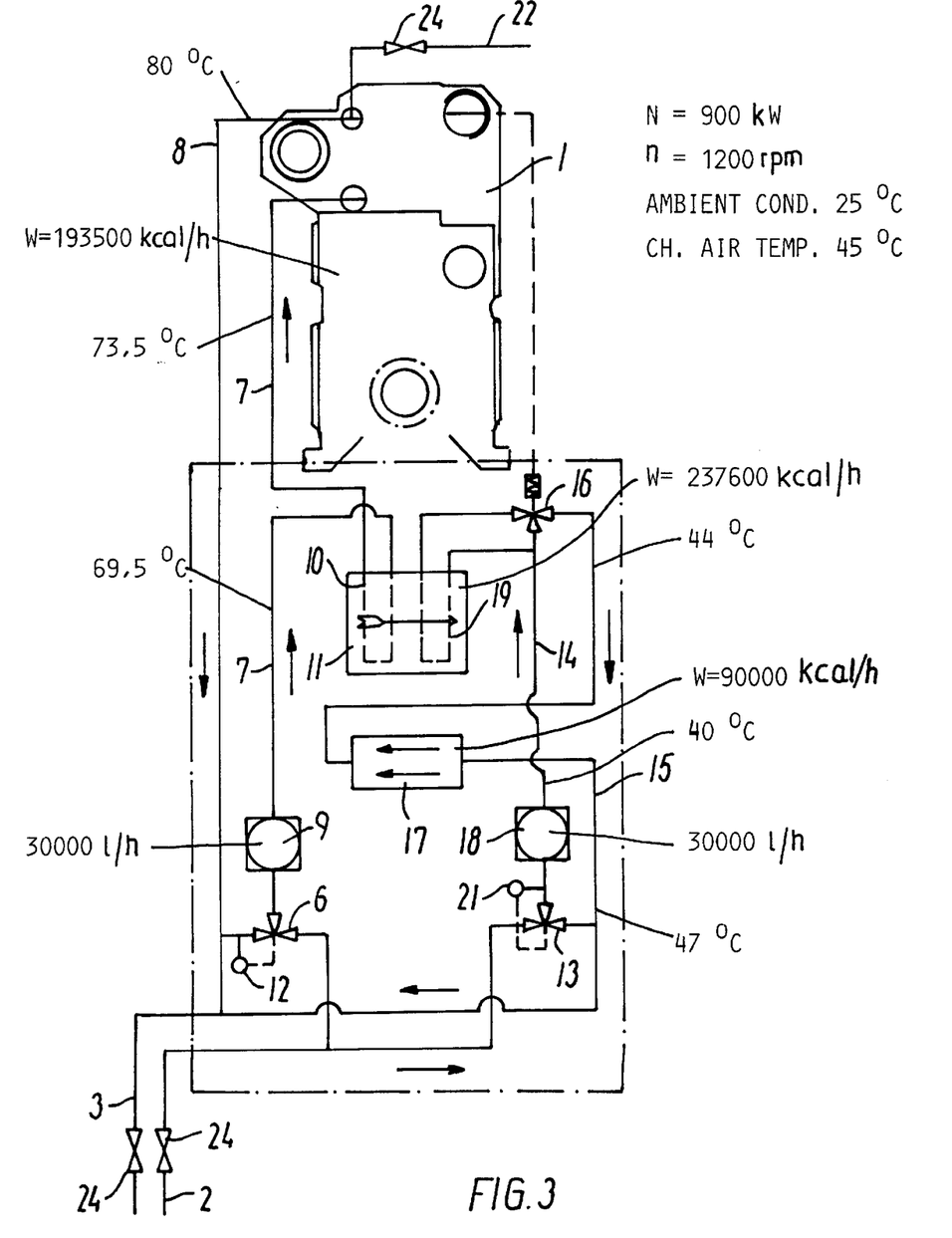

FIG. 2 indicates temperatures and cooling need for an auxiliary engine which is running at no load at a speed of 1200 rpm, an outdoor temperature of 25° C. and a charging air temperature at the engine inlet of 70° C. FIG. 3 lists the same information at full engine load, where the engine at the same number of revolutions yields a shaft output of 900 kW at a charging air temperature of 45° C.

Figure 6:
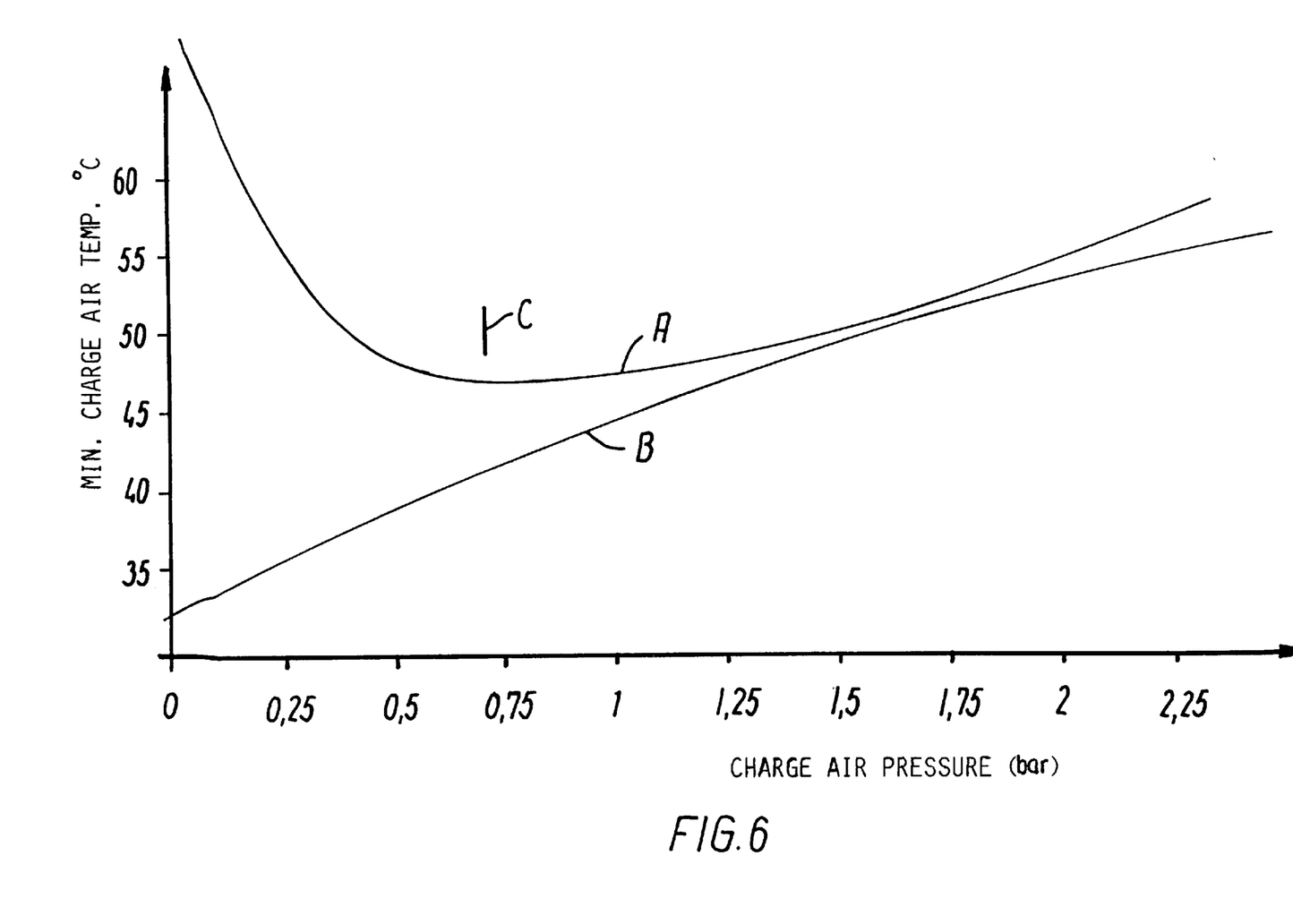
FIG. 6 is a diagram of an example of the minimum charging air temperature as a function of the engine load expressed by the charging air pressure.

In FIG. 6, the graph A shows an example of how the minimum charging air temperature produced by the cooling system depends on the charging air pressure when the first thermosensor 12 and the second thermosensor 21 are set at fixed predetermined values and the engine is operated at an outdoor temperature of 32° C. and at a relative humidity of 100%. The graph B shows the corresponding pressure and temperature-dependent water condensation threshold. The diagram shows that the cooling system will automatically keep the minimum temperature of the charging air suitably above the condensation threshold without any complex control systems. The charging air pressure increases with the engine load, and the idling load corresponds to a charging air pressure of less than 0.1 bar, while the full-load point corresponds to a charging air pressure of about 2.3 bar. At a charging air pressure of about 0.7 bar, indicated at C, the control valve is set to cut off the second cooling step 19 so that at lower loads the charging air is heated by the first step 10 in the HT circuit.

I claim:

1. A multi-engine plant with a common freshwater cooling system, comprising several turbocharged diesel engines having a common supply pipe for coolant and a common return pipe, of which engines at least some in their coolant system are provided with a charging air cooler, a high-temperature circuit (HT) and a low-temperature circuit (LT), the high-temperature circuit containing a first three-way valve which is connected to the common supply pipe and is controlled by a first thermosensor and supplies a first circulation pump in a HT circuit delivery pipe to the engine with recycled coolant from a HT circuit discharge pipe from the engine and with colder coolant at need, which discharge pipe of the HT circuit from the engine is in flow communication with the common return pipe and is connected to the first three-way valve, the low-temperature circuit containing a second three-way valve which is connected to the common supply pipe and is controlled by a second thermosensor and supplies a second circulation pump in a LT circuit delivery pipe to the charging air cooler with recycled coolant from a LT circuit discharge pipe and with colder coolant at need, which discharge pipe of the LT circuit is in flow communication with the common return pipe and is connected to the second three-way valve, and the charging air cooler being a two-step cooler in which the first step is part of the delivery pipe of the HT circuit to the engine, and the second step is part of the LT circuit and is connected to a control valve which is connected to the LT circuit discharge pipe and can close or open more or less for the coolant flow through the second step of the charging air cooler in dependency of the engine load.

2. A multi-engine plant according to claim 1, wherein a water temperature in the discharge pipe of the HT circuit from the engine is measured by the first thermosensor, and that the first three-way valve is controlled so that the water temperature in this discharge pipe is mainly constant regardless of the engine load.

3. A multi-engine plant according to claim 1, wherein a water temperature in the delivery pipe connected with the circulation pump is measured by the second thermosensor, and that the second three-way valve is controlled so that the water temperature in this delivery pipe is mainly constant regardless of the engine load.

4. A multi-engine plant according to claim 1, wherein at least one of the engines runs a power generator, at least a second of the engines is used for propulsion of a ship, and all the discharge pipes of the HT circuits are interconnected via a venting pipe.

5. A multi-engine plant according to claim 4, wherein hot coolant from the engine used for the propulsion is passed via said venting pipe through the generator-connected engine in its stand-by condition.

6. A multi-engine plant according to claim 1, wherein the first and the second circulation pump each circulates a substantially constant volume flow of coolant in the associated circuit regardless of the engine load.

7. A multi-engine plant according to claim 1, wherein the LT circuit contains a lubricant cooler in the discharge pipe from the charging air cooler.

8. A multi-engine plant according to claim 1, wherein a coolant cooler of a ship main engine cools the water in the common return pipe, and the purely power-producing auxiliary engines in the engine plant are designed without coolant coolers in their HT and LT circuits.

9. A multi-engine plant according to claim 1, wherein the coolant in the common return pipe is cooled by a water cooler common to several engines, and that the engines are designed without coolant coolers in the HT and LT circuits.

10. A multi-engine plant according to claim 1, wherein the second thermosensor and the control of the control valve in the LT circuit are set so that at a discharge from the charging air cooler, charging air has temperatures above the condensation threshold for humidity in the air when the engine is run at tropical conditions with a very high temperature and a high humidity in the inlet air.

11. A multi-engine plant according to claim 1, wherein the two circulation pumps, the two three-way valves, the control valve, the lubricant cooler, the charging air cooler and the associated pipe connections are all located at one end of the engine.

12. A multi-engine plant with a common freshwater cooling system, comprising several turbocharged diesel engines having a common supply pipe for coolant and a common return pipe, of which engines at least some in their coolant system are provided with a charging air cooler, a high-temperature circuit (HT) and a low-temperature circuit (LT), the high-temperature circuit containing a HT circuit delivery pipe to the engine, a HT circuit discharge pipe from the engine, and a first circulation pump, the low-temperature circuit containing a LT circuit delivery pipe to the charging air cooler, a LT circuit discharge pipe from the charging air cooler, and a second circulation pump, the charging air cooler being a two-step cooler in which the first step is part of the delivery pipe of the HT circuit to the engine, and the second step is part of the LT circuit, a control valve being connected to the LT circuit for adjusting coolant flow through the second step of the charging air cooler in dependency of the engine load.

13. A multi-engine plant according to claim 12, wherein the two circulation pumps, the control valve, the charging air cooler and the associated pipe connections are all located at one end of the engine.

14. A multi-engine plant according to claim 12, wherein the LT circuit contains a lubricant cooler in the discharge pipe from the charging air cooler.

15. A multi-engine plant according to claim 14, wherein the two circulation pumps, the control valve, the lubricant cooler, the charging air cooler and the associated pipe connections are all located at one end of the engine.

16. A multi-engine plant according to claim 12, wherein the coolant in the common return pipe is cooled by a water cooler common to several engines, and that the engines are designed without coolant coolers in the HT and LT circuits.

17. A multi-engine plant according to claim 12, wherein at a discharge from the charging air cooler, charging air has temperatures above the condensation threshold for humidity in the charging air when the engine is run at tropical conditions with a very high temperature and a high humidity in ambient air.

* * * * *